US006442782B1

(12) United States Patent
Vande Haar

(10) Patent No.: US 6,442,782 B1
(45) Date of Patent: Sep. 3, 2002

(54) BALL BALANCING MECHANISM

(75) Inventor: Evan R. Vande Haar, Pella, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/560,692

(22) Filed: Apr. 27, 2000

(51) Int. Cl.[7] ............................ F16F 15/22; D06F 37/24
(52) U.S. Cl. ..................... 8/159; 68/23.2; 74/573 R; 74/573 F
(58) Field of Search ..................... 68/23.2; 74/573 R, 74/573 F; 8/159

(56) References Cited

U.S. PATENT DOCUMENTS

| | | | |
|---|---|---|---|
| 4,433,592 A | 2/1984 | Tatsumi et al. | 15/22 |
| 5,142,936 A | 9/1992 | McGale | 74/573 |
| 5,761,932 A | 6/1998 | Kim | 68/23.2 |
| 5,782,110 A | 7/1998 | Kim | 68/23.3 |
| 5,802,885 A | 9/1998 | Kim | 68/23.2 |
| 5,806,349 A | 9/1998 | Kim et al. | 68/23.2 |
| 5,850,748 A | 12/1998 | Kim et al. | 68/23.2 |
| 5,850,749 A | 12/1998 | Kim | 68/23.2 |
| 5,857,360 A | 1/1999 | Kim et al. | 68/23.2 |
| 5,857,361 A | 1/1999 | Jang | 68/23.2 |
| 5,906,756 A | 5/1999 | Lee et al. | 219/117.1 |

FOREIGN PATENT DOCUMENTS

SU  1195203  * 11/1985  ............... 74/573 R

* cited by examiner

*Primary Examiner*—Philip Coe
(74) *Attorney, Agent, or Firm*—McKee, Voorhees & Sease, P.L.C.

(57) ABSTRACT

A ball balancing mechanism includes an annular ring having a hollow cross section forming an enclosed hollow cavity therein. A circular race is placed within the hollow cavity and extends around the circumference of the annular ring. A plurality of balls are retentively contained within the annular race and are free to roll within the race around the circumference of the ring.

9 Claims, 3 Drawing Sheets

BALL BALANCING MECHANISM

BACKGROUND OF THE INVENTION

The present invention relates to a ball balancing mechanism for dynamically balancing rotating objects.

Dynamic balancing of rotating objects utilizing balance rings having spherical weights is known in the prior art. However, certain disadvantages are encountered with prior art devices, particularly when the balancing ring is made from plastic. The spherical weights are usually made from metal and during the rotation of the object the spherical weights can deform or damage the plastic as a result of centripetal force.

Therefore, a primary object of the present invention is the provision of an improved ball balancing mechanism for rotating objects.

A further object of the present invention is the provision of an improved ball balancing mechanism having structure that is stiff enough to allow the balls to roll freely even at high centripetal acceleration.

A further object of the present invention is the provision of a rolling surface for the balls which is strong enough to withstand the contact stresses of the rolling balls.

A further object of the present invention is the provision of an improved ball balancing mechanism which is economical to manufacture, efficient in operation, and durable in use.

SUMMARY OF THE INVENTION

The foregoing objects may be achieved by a ball balancing mechanism formed from an annular ring having a hollow cross section creating an enclosed hollow annular cavity therein. An annular race is placed within the hollow cavity and extends around the entire circumference of the ring. A plurality of spherical weights are retentively contained with the annular race and are free to roll in a circumferential direction within the annular race around the circumference of the annular ring.

According to one feature of the invention the annular race is comprised of metal and the annular ring is comprised of plastic.

According to another feature of the invention a damping fluid is contained within the hollow cavity and bathes the spherical weights to cause damping of the movement of the spherical weights in the race.

According to another feature of the present invention the race has a C-shaped cross section and the opening of the C-shaped cross section faces generally in an inner radial direction with respect to the annular center of the ring.

The preferred use for the balancing ring is in connection with either a vertical or horizontal axis washing machine tub wherein the annular ring is mounted to the washing machine tub with its central axis aligned with the rotating axis of the washing machine tub.

While the use of the annular ring with a washing machine tub is preferred, the annular ring maybe used for other rotating objects without detracting from the invention.

According to the method of the present invention a balancing ring having a central ring axis is attached to a rotatable object in a position wherein the central ring axis of the balancing ring is aligned with the rotating axis of the object.

DETAILED DESCRIPTION OF THE PREFERRED EMBODIMENT

Figure 1:
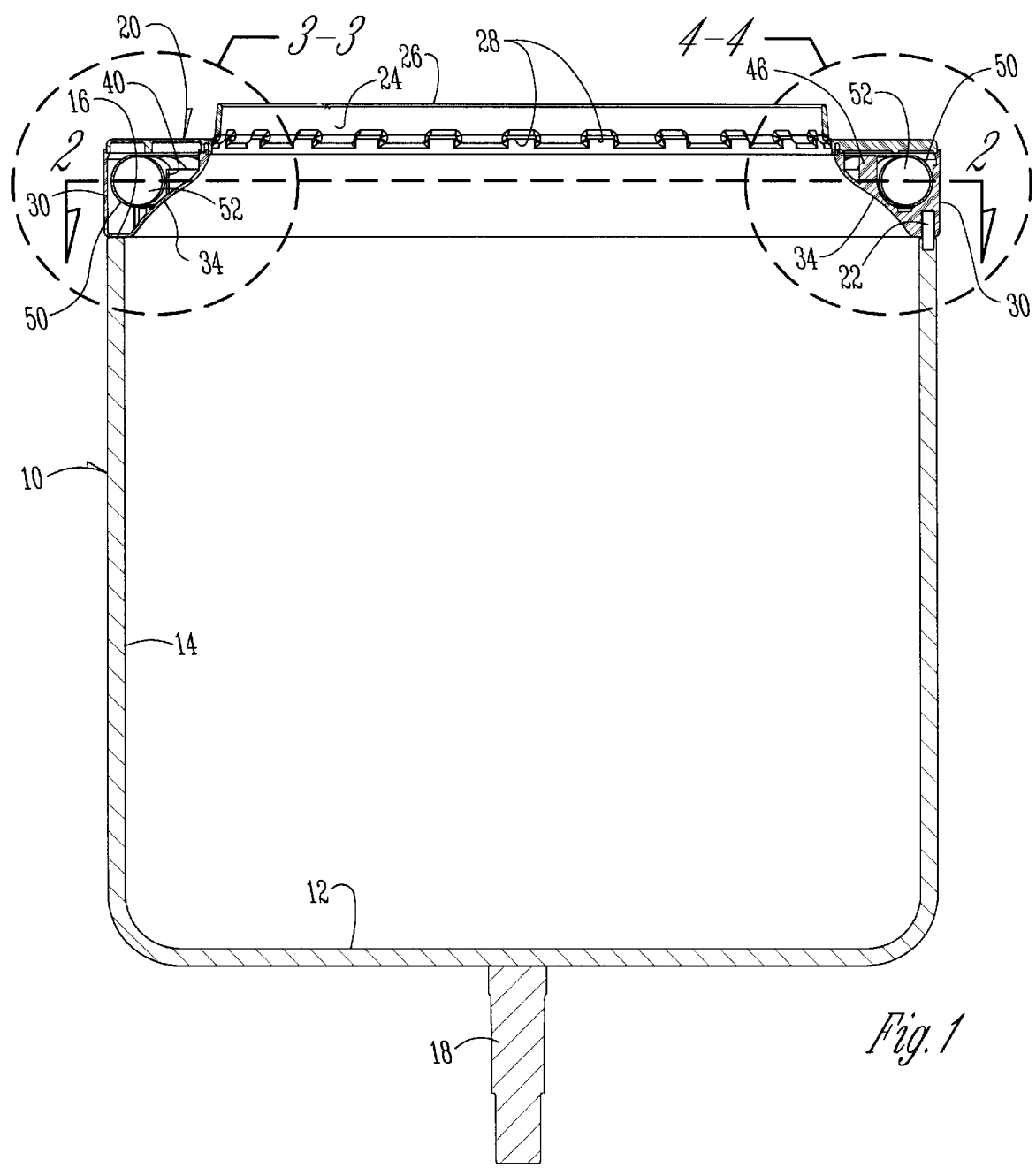
FIG. 1 is a sectional view taken along line 1—1 of FIG. 2.

Referring to the drawings the numeral 10 generally designates a tub having a bottom wall 12 and a side wall 14 with an upper edge 16. It is anticipated that the tub can also be spherical in shape. Protruding downwardly from the bottom wall 12 of the tub 10 is a shaft 18 which is adapted to be rotatably mounted within a washing machine so that the tub will rotate about a tub axis formed by the shaft 18.

Mounted to the upper edge 16 of the tub 10 is an annular donut shaped balancing ring 20. Balancing ring 20 is attached to the upper edge 16 by a plurality of studs 22 spaced circumferentially around the circumference of the edge 16.

Balancing ring 20 includes an upwardly protruding flange 26 which forms an access opening 24 at the top of tub 10. A perforated surface 28 is tapered radially inwardly and downwardly so as to cause fluids to drain towards the center of the tub.

The annular balancing ring 20 includes an outer wall 30, a bottom wall 32 (FIGS. 3 and 4), a curved inner wall 34 and a top wall 36. Top wall 36 is initally detached during assembly and after assembly is welded over the top of the balancing ring 20.

Figure 2:
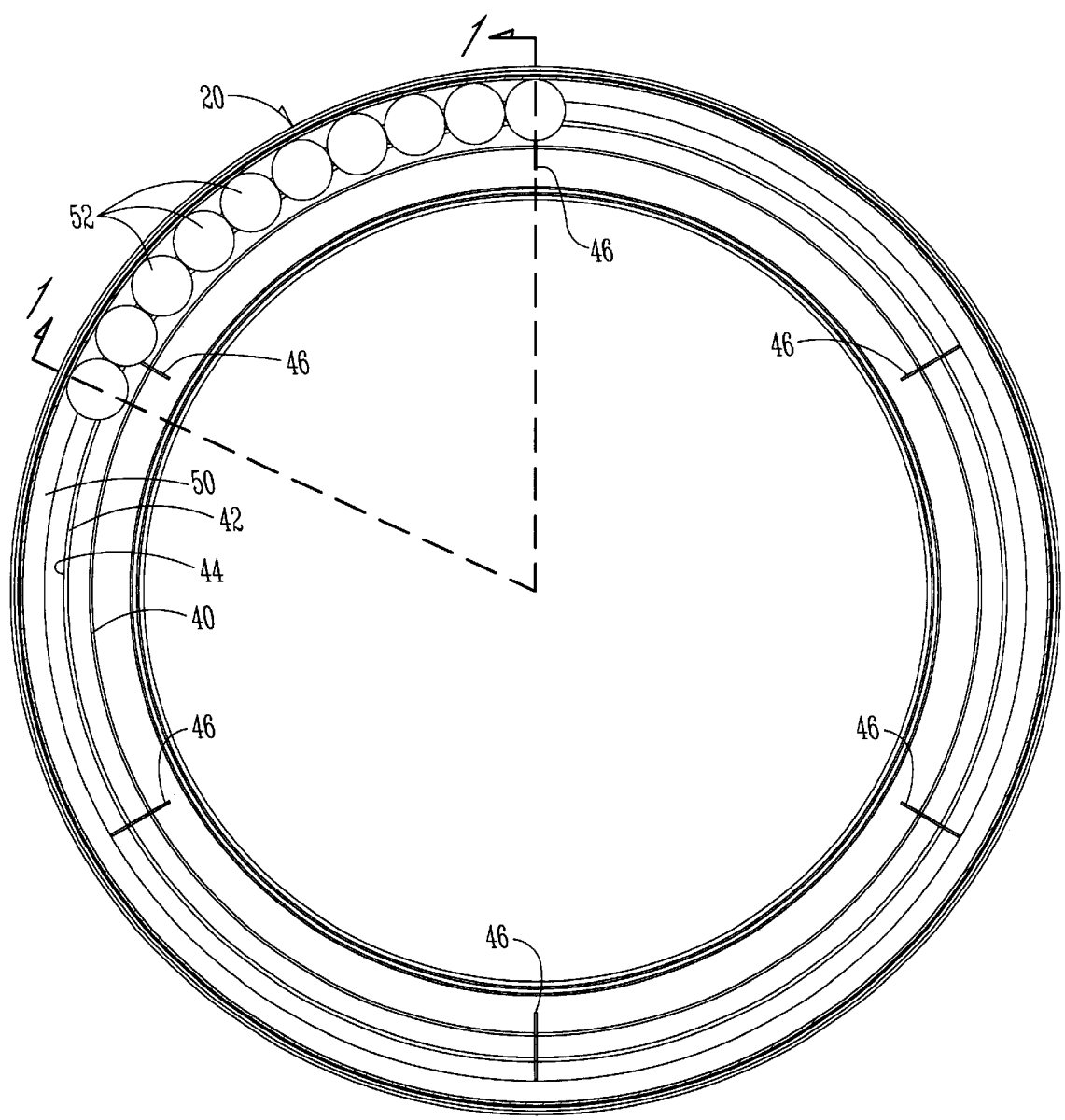
FIG. 2 is a sectional view taken along line 2—2 of FIG. 1.

Enclosed within the balancing ring 20 is an annular cavity 38 which extends around the circumference of the ring 12. Within cavity 38 are an inner confining flange 40, and a pair of lower support flanges 42, 44, all of which extend around the circumference of the ring 20. A plurality of circumferentially spaced ribs 46 are shown in FIG. 2 to be spaced around the circumference of the ring 20. Each rib 46 includes a semicircular upwardly presented cut out 48 (FIG. 4).

Figure 3:
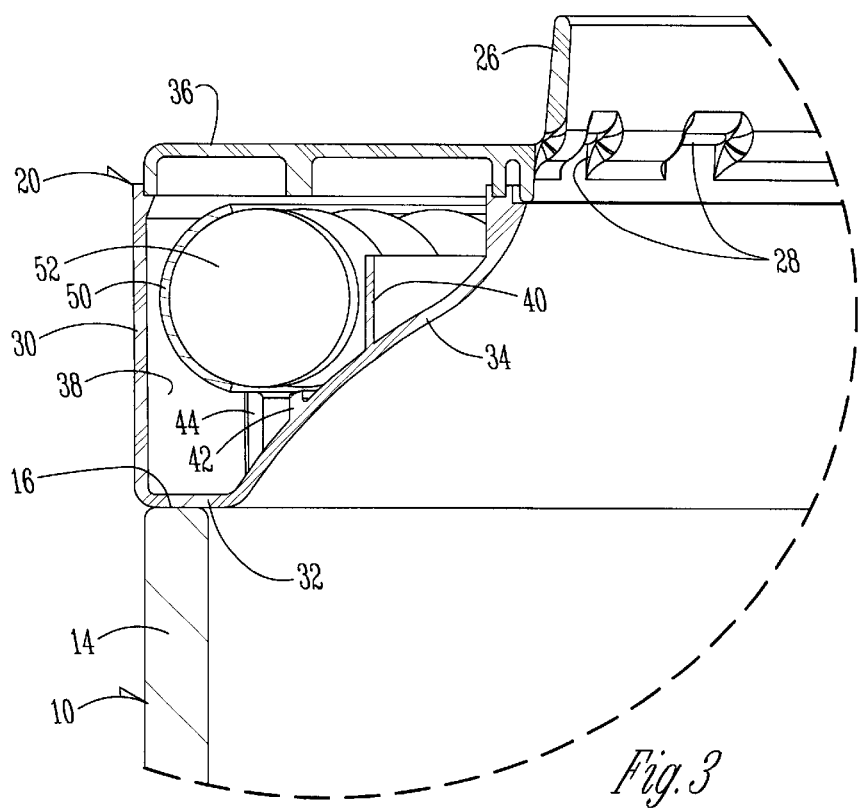
FIG. 3 is an enlarged view taken along line 3—3 of FIG. 1.
Figure 4:
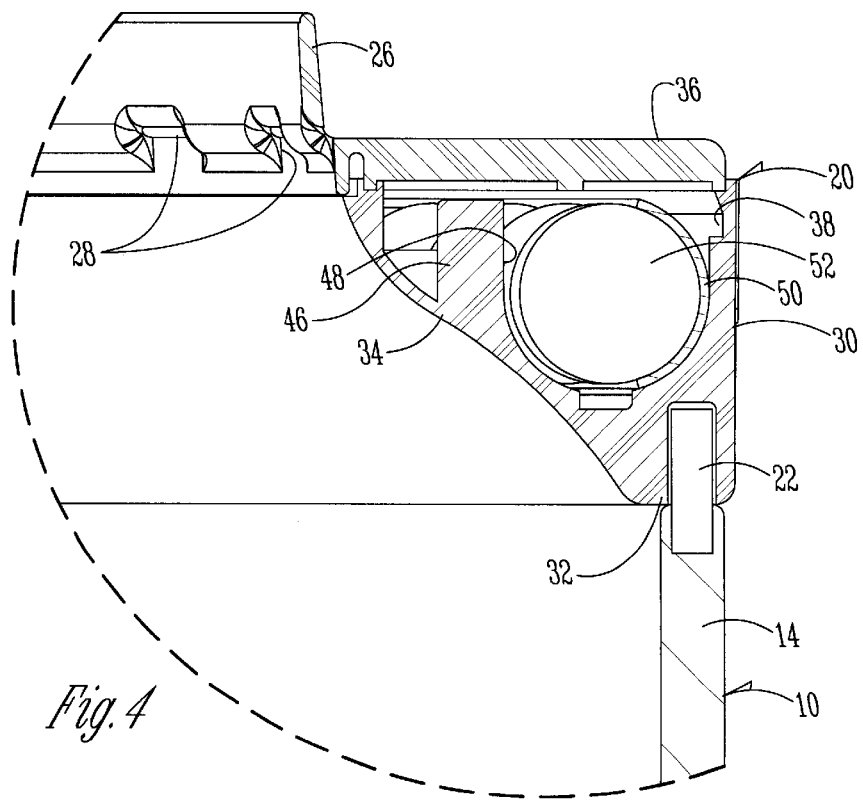
FIG. 4 is an enlarged view taken along line 4—4 of FIG. 1.

Also fitted within the annular cavity 38 is a circular ball race 50 which is C-shaped in cross section as can be seen in FIGS. 3 and 4. The open ends of the C-shaped cross section are presented radially inwardly, and the race 50 provides an outer radial surface for absorbing any centripetal force exerted by a plurality of spherical weights or balls 52.

While the materials used for the balance ring may vary without detracting from the invention, it is preferred that the ring housing itself be formed from plastic, and that the ball race 50 be formed from metal. This enables the ball race 50 to provide a smooth hard surface against which the balls 52 can roll during the rotation of the tub 10. The race 50 fits within the arcuate cut outs 48 of the ribs 46 and is supported by this arcuate cut out 48. The balls 52 are confined by the race 50, the lower support flanges 42, 44, and the inner flange 40. These objects confine the balls 52 so that they remain embraced by the race 50 and are free to roll in a circumferential direction to any position around the circumference of the balancing ring 20.

A damping fluid such as mineral oil or silicone oil partially fills the cavity 38 and bathes the spherical weights 52. This oil has the effect of damping the movement of the balls 52 as they rotate, and also facilitates the lubrication and smooth rolling of the balls 52.

The use of steel for the race 50 provides a smooth hard surface which permits the spherical weights or balls 52 to roll more freely. If the spherical weights or balls 52 are permitted to roll against the plastic housing of the annular ring, they can possibly deform the plastic housing and be inhibited from free rolling motion after extended rotation of the tub 10. Therefore the use of a metal race or a race formed from a hard material other than metal provides an improved result by permitting the free rolling of the spherical weights or balls 52 without being deformed.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. A ball balancing mechanism for attachment to, and for dynamically balancing a rotating object comprising:

an annular ring having a hollow cross section to form an enclosed annular hollow cavity therein;

an annular race within said hollow cavity extending around the entire circumference of said annular ring; and a plurality of balls retentively contained within said annular race, and being free to roll within said annular race around the circumference of said annular ring;

said annular race being comprised of metal and said annular ring being comprised of plastic.

2. A ball balancing mechanism according to claim 1 and further comprising a quantity of damping fluid contained within said hollow cavity and bathing said balls to cause damping of the movement of said balls in said race.

3. A ball balancing mechanism according to claim 1 wherein said race in cross section has a C-shape.

4. A ball balancing mechanism according to claim 3 wherein the opening of said C-shaped cross section of said race faces generally in an inner radial direction with respect to the annular center of said ring.

5. In combination:

a tub having a side wall and a bottom wall forming a tub chamber, said side wall surrounding a tub axis;

a shaft extending downwardly from said bottom wall for mounting said tub to rotate about said tub axis;

an annular ring having a hollow cross section to form an enclosed annular hollow cavity therein;

an annular race within said hollow cavity extending around the entire circumference of said hollow cavity; and a plurality of spherical weights retentively contained within said annular race, and being free to roll within said annular race around the circumference of said annular ring;

said annular ring having a central axis and being attached to said tub in a position with said central axis of said annular ring in registered alignment with said tub axis;

said annular race being comprised of metal and said annular ring being comprised of plastic.

6. The combination according to claim 5 and further comprising a quantity of damping fluid contained within said hollow cavity and bathing said spherical weights to cause damping of the movement of said spherical weights in said race.

7. The combination according to claim 5 wherein said race in cross section has a C-shape.

8. The combination according to claim 7 wherein the opening of said C-shaped cross section of said race faces generally in an inner radial direction with respect to the annular center of said ring.

9. A method for balancing an object that is adapted to rotate about an object axis, said method comprising:

attaching a plastic balancing ring having a central zing axis to said object in a position wherein said ring axis is aligned with said object axis, said balancing ring having a hollow cross section forming an enclosed annular cavity therein;

enclosing a metal circular race within said annular cavity;

placing a plurality of spherical weights within said circular race so that said spherical weights are retentively held in said circular race and are free to roll in a circumferential direction around said circular race;

rotating said object whereby said spherical weights will roll freely around said circular race to positions that will dynamically balance said rotating object whereby said metal circular race prevents said spherical weights from deforming said plastic balancing ring during rotation of said object.

* * * * *